United States Patent Office 3,402,597
Patented Sept. 24, 1968

3,402,597
METHOD AND APPARATUS FOR THE DETERMINATION OF THE MOLECULAR WEIGHT OF ORGANIC CHEMICAL COMPOUNDS
János Szilágyi and Sándor Nagy, Budapest, Hungary, assignors to Metrimpex Magyar Muszeripari Kuldereskedelmi Vallalat, Budapest, Hungary
Filed Oct. 18, 1965, Ser. No. 497,487
Claims priority, application Hungary, Oct. 26, 1964,
SE–1,225
2 Claims. (Cl. 73—53)

ABSTRACT OF THE DISCLOSURE

Three vessels are disposed in a closed and evacuated chamber. The tops of the vessels are open to communicate with each other within the chamber. Two vessels contain solutions of different but known molarities and known molecular weight. The third vessel contains a known weight of a substance of unknown molecular weight, in solution in the same solvent as in the other two vessels. The three vessels are maintained in vapor communication with each other until there has been substantial progress toward equilibrium, that is, until the mol concentrations move toward equality with each other with the remaining differences in mol concentrations moving themselves toward equality with each other. A comparison of the weight of the three vessels before and after provides data for the calculation of the unknown molecular weight.

---

Figure 1:
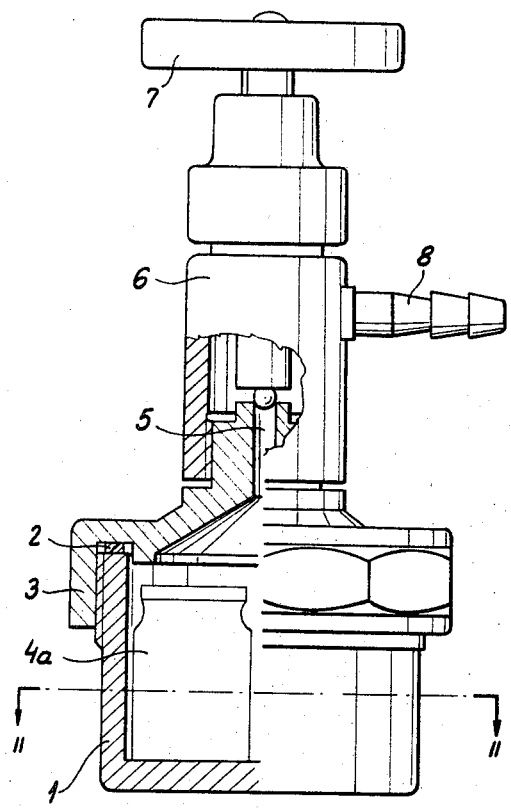

The present invention relates to a method and an apparatus for the determination of the molecular weight of organic chemical compounds.

Methods based on isothermal distillation give reliable molecular weights of solid organic compounds, and of compounds of low vapor tension. The phenomenon utilized by these methods consists in that from solutions of different molarity or molality, when these are exposed towards a common closed space, the solvent evaporates by isothermal distillation in such a way that solvent from the less concentrated solution is transferred into the more concentrated solution until the difference in molar or molal concentrations becomes zero. The determination of molecular weight is carried out in practice by preparing a series of solutions of different known molar or molal concentrations from one or more compounds of known molecular weight, and a solution of known concentration by weight of the compound, the molecular weight of which is to be determined.

In a known process, drops of the reference solutions and drops of the sample solution are alternately picked up in a capillary glass tube and after the lapse of a suitable time that pair of solution-drops is noted of which the lengths in the capillary tube do not change during standing. The molar concentration of two such drops is nearly the same, and on this basis the molecular weight of the sample can be calculated. The observation of the length of the drops, and the change of this length, is made with the help of a suitable microscope.

There are known apparatuses whereby the lengthy and cumbersome measurement of drop-lengths in the capillary is obviated in so far as the progress of the isothermal distillation is followed by measurements of changes in volumes. In principle, the accuracy of the known methods utilizing the phenomenon mentioned above is limited by two factors.

One factor is the magnitude to be measured and the limits of accuracy of its measurement. The methods in use require the measurement of lengths or volumes, and the apparatuses devised do not provide for anything else.

The other factor is the character of isothermal distillation. Since the driving force of isothermal distillation varies as the concentration difference between the solutions, and since isothermal distillation tends to eliminate this difference, it is a self-defeating process that would, in principle, reach complete equilibrium only after infinite time.

The present invention eliminates the effect of the disadvantageous factors mentioned by a method and apparatus suitable for the determination of the molecular weight of organic compounds on micro or semimicro samples thereof. The essence of the procedure according to the invention is that different amounts of a standard substance are weighed into at least two weighing vessels. A similarly determined amount of the matter of unknown molecular weight is weighed into a further weighing vessel. Then portions of the same solvent are added to the weighed substances and the uncovered measuring vessels are placed in a common, closed container placed under vacuum and—making use not only of the tendency of mole concentrations to become equal but also of the tendency of mole concentration differences to become equal—subjected to isothermic distillation—after the isothermic distillation, the weighing vessels are taken from the container, weighed separately and afterwards the molecular weight of the unknown substance is calculated from the substance weights and the corresponding solvent weights in such a manner that if the molecular weight to be determined falls between that of the two standard substances, the unknown molecular weight is equal to the arithmetical mean of the values, while if it is lower or higher than the molecular weight of the two known substances, the molecular weight calculated for the unknown substance must be increased or decreased respectively, with a correction calculated from the molecular weight difference calculated for the two substances of known molecular weight and the arithmetical mean giving the molecular weight of the unknown substance is calculated after this.

The apparatus according to the invention, consists in essence in a common receptacle which can be closed by an air-tight lid properly secured and having an opening through which the receptacle and the space enclosed by the lid can be evacuated and kept evacuated for a prolonged period of time, the said receptacle being formed so as to hold at least two vessels each to be filled with a solution of known molar or molal concentration of compounds of known molecular weight, and to hold at least one more vessel to be filled with a solution of known concentration by weight of the compound, the molecular weight of which is to be determined, the said not less than three vessels being open towards the common space enclosed by the said lid.

The apparatus according to the invention makes it possible, on the one hand, to introduce the measurement of weights into this method, which measurement is the easiest and simplest to carry out with a high degree of accuracy, and, on the other hand, to utilize the character of isothermal distillation to advantage in the determination of molecular weight, this character working against the attainment of the necessary accuracy in other methods.

Consequently, the process according to the invention makes use not only of the tendency of mole concentrations to become equal, but also of the tendency of mole concentration differences to become equal.

Such utilization is made possible by having the solution of the compound of unknown molecular weight in communication through the common space with at least two solutions of different known molar or molal concentrations of the compound or compounds of known molecular weight, whereby discrete known stages of isothermal distillation are ascertainable and sufficient for basing on them the determination of molecular weight, without the necessity to await an equilibrium state to be reached in this process. The discrete stages referred to are ascertainable by measuring the changes in weight of the solutions, and these weights can be measured to a high degree of accuracy.

Figure 2:
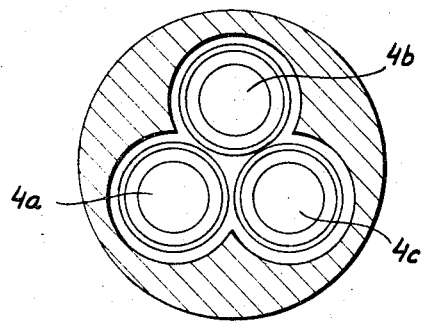

The process and the apparatus according to this invention are described in what follows further on the basis of the two examples and the apparatus is illustrated by FIG. 1 showing a partly exploded view of it and by FIG. 2 showing its section along the line II—II.

In a possible form of its realization, the apparatus is in essence a cup 1 closed with a lid 3 this being fastened onto the cup by bayonet locks, screw-threads or any other suitable device, a tight closure being effected by packing 2 so that cup 1 and lid 3 form one closed receptacle. In cup 1 weighing vessels 4a, 4b, 4c are placed. Cup 1 is made advantageously from one block so that its dead-space is at a minimum and its heat capacity at a suitable high value. The inner surface of lid 3, facing the cup 1, is concave so that above weighing vessels 4a, 4b, 4c a space common to them is enclosed. The outer surface of lid 3 carries a threaded pipe-end 5 to which valve 6 is attached and closed or opened by regulating wheel 7. Exit branch 8 from valve 6 can be connected to a vacuum pump not shown in the figures.

According to this invention the determination of molecular weight can be carried out as follows.

Weighing vessels 4a and 4b, of known tare weight, are charged each with a known quantity of a reference compound, i.e., with compounds of known molecular weight, and weighing vessel 4c of known tare weight is charged with a known quantity of the compound of unknown molecular weight. If the apparatus is constructed so as to accommodate more than three vessels, more samples of the compound of unknown molecular weight can be used at the same time. A common solvent of the reference and sample compounds is added, advantageously in the same quantity, into the vessels which are than placed into cup 1 this being then closed with the help of packing 2 by lid 3 to form an airtight seal. Turning regulating wheel 7 to open valve 6 through pipe-end 5 air is removed from the cup by a vacuum pump. The vapour of the solvent will then fill the common space above the vessels. By turning regulating wheel 7 to close valve 6 the apparatus is ready for the determination. The closed apparatus is then put into a thermostatically controlled heating chamber or is left standing in the room, at a temperature and for a duration chosen according to the boiling point of the solvent applied, i.e., the solutions placed in the vessels are subjected to isothermal distillation, in the course of which the concentrations of the reference solutions change at approximately the same rate towards equilibrium concentration. After isothermal distillation has proceeded for a suitable time, air is allowed to enter the apparatus through valve 6. Then lid 3 is taken off, the weighing vessels are suitably stoppered or closed, and weighed.

From weight data for the respective solvent and substance quantities the unknown molecular weight of the test substance is calculated by solution-pairs. If the molecular weight sought is expected to fall between the molecular weights of the reference substances, then the arithmetic mean of the molecular weights calculated by pairs is the true molecular weight of the substance under test. If the molecular weight sought is lower or higher than the molecular weights of the reference substances then a correction value is calculated from their molecular weight difference and this value is added to or subtracted from the molecular weights found for the test substance and then the arithmetic mean of these corrected molecular weights is established as the true molecular weight of the substance under test.

As examples of the method, the determination of the molecular weight of acetanilide, of iodine-antipyrine, and of dinitrophenol are given.

*Example 1.—The determination of the molecular weight of acetanilide*

Benzyl can be used as a reference compound, and acetone as the solvent. The weighing vessels are charged with the solutions and placed in the apparatus which is then closed and kept at 36° C. for, say, four days. The data to be noted can be tabulated as follows.

| Substance | | Weight of solutions after isoth. distillation | Molecular weight | | Theor. value | Deviation rel. percent |
|---|---|---|---|---|---|---|
| Name | Weight in mg. | | Found | Mean | | |
| Benzyl | 22.910 | 638.900 | 134.05 | 135.27 | 135.16 | +0.08 |
| Acetanilide | 12.200 | 533.180 | 136.50 | | | |
| Benzyl | 17.800 | 505.090 | | | | |

*Example 2.—The determination of the molecular weight of iodine-antipyrine*

Benzyl can be used as a reference compound, and acetone as the solvent. The weighing vessels are charged with the solutions and placed in the apparatus which is then closed and kept at 34° C. for, say, four days.

| Substance | | Weight of solutions after isothermal distillation | Corrected molecular weight | | Theor. value | Deviation rel., percent |
|---|---|---|---|---|---|---|
| Name | Weight in mg. | | Found | Mean | | |
| Benzyl | 22.680 | 639.410 | 304.45+9.90 | 314.38 | 314.13 | +0.07 |
| Do | 17.820 | 510.710 | 309.47+4.95 | | | |
| Iodine-antipyrine | 19.312 | 375.990 | | | | |

*Example 3.—The determination of the molecular weight of dinitrophenol*

Benzyl can be used as a reference compound, and acetone as the solvent. The weighing vessels are charged with the solutions and placed in the apparatus which is then closed and kept at 36° C. for, say, five days.

| Substance | | Weight of solutions at "equilibrium" in mg. | Molecular weight | | Theor. value | Deviation rel., percent |
|---|---|---|---|---|---|---|
| Name | Weight in mg. | | Found | Mean | | |
| Benzyl | 41.270 | 919.835 | 179.47 | 187.71 | 184.11 | −0.21 |
| Dinitrophenol | 19.010 | 496.352 | 187.96 | | | |
| Benzyl | 13.790 | 312.900 | | | | |

What we claim is:

1. A process for the determination of the molecular weight of an organic compound, comprising establishing two solutions of an organic compound of known molecular weight in two different weighing vessels with the concentrations of the two solutions distinctively different from each other, establishing in a third weighing vessel a solution of an organic compound whose molecular weight is to be determined, in the same solvent as in the other two weighing vessels, placing the three weighing vessels under vacuum in a closed container with the solutions in the three vessels in free vapor communication with each other for a period of time sufficient to permit the molar concentrations of the three solutions to move toward equality and the differences between the molar concentrations to move toward equality, and thereafter separately weighing the three vessels with their contained solutions to provide a basis for determination of the unknown molecular weight.

2. A method as claimed in claim 1, and heating the vessels in the closed container to hasten the changes in molar concentration.

References Cited

UNITED STATES PATENTS 2,567,215  9/1951  Lacks _____ 73—45.5
3,282,082  11/1966 Fagioli et al. ____ 73—61.3 XR

FOREIGN PATENTS 1,128,182  4/1962  Germany.

OTHER REFERENCES

Young et al.: Anal. Chem., vol. 19, February 1947, pages 135–137.

DAVID SCHONBERG, *Primary Examiner.*